United States Patent
Watanabe

(10) Patent No.: US 11,838,629 B2
(45) Date of Patent: *Dec. 5, 2023

(54) IMAGE PROCESSING APPARATUS AND CONTROL METHOD THEREOF, IMAGING APPARATUS, AND STORAGE MEDIUM

(71) Applicant: CANON KABUSHIKI KAISHA, Tokyo (JP)

(72) Inventor: Kentaro Watanabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/067,639

(22) Filed: Dec. 16, 2022

(65) Prior Publication Data

US 2023/0117507 A1    Apr. 20, 2023

Related U.S. Application Data

(63) Continuation of application No. 17/670,438, filed on Feb. 12, 2022, now Pat. No. 11,570,352.

(30) Foreign Application Priority Data

Feb. 26, 2021   (JP) .................................. 2021-030780

(51) Int. Cl.
*H04N 23/67* (2023.01)
*G03B 13/36* (2021.01)
*H04N 23/611* (2023.01)
*H04N 23/63* (2023.01)

(52) U.S. Cl.
CPC .......... *H04N 23/675* (2023.01); *G03B 13/36* (2013.01); *H04N 23/611* (2023.01); *H04N 23/635* (2023.01)

(58) Field of Classification Search
CPC .. H04N 23/675; H04N 23/611; H04N 23/635; G03B 13/36
See application file for complete search history.

(56) References Cited

U.S. PATENT DOCUMENTS

| 9,311,712 B2 | 4/2016 | Fukata .................. G06T 7/0044 |
| 9,876,950 B2* | 1/2018 | Nakamura ........... H04N 23/635 |
| 10,326,927 B2 | 6/2019 | Sasaki ............. H04N 5/232122 |
| 2011/0115967 A1* | 5/2011 | Lee ....................... H04N 23/676 348/E5.045 |
| 2012/0200729 A1* | 8/2012 | Hoda ................... H04N 23/635 348/222.1 |

(Continued)

FOREIGN PATENT DOCUMENTS

| JP | 2012-015889 | 1/2012 |
| JP | 2019-041414 | 3/2019 |

*Primary Examiner* — Shahbaz Nazrul
(74) *Attorney, Agent, or Firm* — Venable LLP

(57) ABSTRACT

An imaging apparatus is configured to detect a plurality of portions of a subject from a captured image. The imaging apparatus is configured to set a region that is related to a detection region of the subject as a related region, and to set an arbitrary region in the image as a search region. In a case where the search region overlaps with at least one of a detection region or a related region of the subject, even if the related region is a region that does not include the detection region, the search region is configured to be set as an AF (autofocus) target region, and AF target region notification processing is executed.

14 Claims, 6 Drawing Sheets

(56) References Cited

U.S. PATENT DOCUMENTS

| | | | |
|---|---|---|---|
| 2014/0104483 A1 | 4/2014 | Kunishige | H04N 5/232 |
| 2014/0226914 A1* | 8/2014 | Mocanu | H04N 23/743 |
| | | | 382/255 |
| 2016/0295100 A1 | 10/2016 | Yokozeki et al. | H04N 5/232 |
| 2017/0118404 A1 | 4/2017 | Song | H04N 5/232 |
| 2017/0289441 A1 | 10/2017 | Zhang | H04N 5/232 |
| 2018/0348470 A1 | 12/2018 | Suzuki et al. | G02B 7/09 |
| 2019/0116318 A1 | 4/2019 | Ogawa | H04N 5/232 |
| 2021/0067685 A1* | 3/2021 | Ishii | H04N 23/611 |
| 2021/0203850 A1* | 7/2021 | Konishi | H04N 23/682 |
| 2021/0329172 A1 | 10/2021 | Ishii | H04N 5/232 |
| 2022/0086359 A1 | 3/2022 | Aoba et al. | H04N 5/232 |
| 2022/0086361 A1 | 3/2022 | Maeda et al. | H04N 5/232 |
| 2022/0264005 A1* | 8/2022 | Nomura | H04N 23/667 |
| 2022/0277585 A1 | 9/2022 | Iwamoto | G06V 40/16 |

* cited by examiner

IMAGE PROCESSING APPARATUS AND CONTROL METHOD THEREOF, IMAGING APPARATUS, AND STORAGE MEDIUM

This application is a continuation of application Ser. No. 17/670,438 filed Feb. 12, 2022, currently pending; and claims priority under 35 U.S.C. § 119 to Japan Application No. 2021-030780 filed in Japan on Feb. 26, 2021; and the contents of all of which are incorporated herein by reference as if set forth in full.

BACKGROUND OF THE INVENTION

Field of the Invention

The present invention relates to a technique for performing detecting and setting of a subject based on a captured image.

Description of the Related Art

There exists a technique for detecting a subject from an image acquired by an image sensor in an imaging apparatus and focusing on the subject by autofocus (AF) control. In contrast, to assist a user to focus on an arbitrary position in the image, there is a technique for displaying a rectangular frame (hereinafter referred to as a "fixed AF frame") in a part of a captured image and focusing on the rectangular frame region in accordance with a user operation instruction. By combining the two techniques, both a subject detection frame and a fixed AF frame can be displayed, and it is possible to determine which frame to focus on based on the position and region information of each frame. By notifying the user about the result, it is possible to improve the rate of concordance between the target of the focusing operation and the target according to the user's intention.

Japanese Unexamined Patent Application Publication No. 2012-15889 discloses a technique for accurately recognizing a subject. According to the state of the image or the imaging mode, a touch allowable frame that is wider than the subject frame is set, and when a specified position on the image is detected by the user, the subject to be tracked is recognized based on the touch allowable frame and the specified position.

In this connection, for example, if the subject to be detected is small in size or moves quickly, it becomes difficult for the user who is holding the imaging apparatus to continue to keep the subject detection frame within the range of the fixed AF frame. Even if a user intends for a desired subject to be made an AF target, there is a possibility that the user will not be able to maintain an overlap state between the subject detection frame and the fixed AF frame, making it difficult to select the desired subject as an AF target.

SUMMARY OF THE INVENTION

The present invention provides an image processing apparatus capable of setting a detection region of a desired subject to a target region for processing.

The image processing apparatus according to one embodiment of the present invention is an image processing apparatus for processing a captured image, the image processing apparatus comprising: detection unit configured to detect a subject from the image, and acquires first and second detection regions; related region setting unit configured to set the first detection region as a related region relating to the second detection region; search region setting unit configured to set a search region related to a subject in the image; and, target setting unit configured to set an arbitrary region of the image to a target region for processing, wherein, in a case in which the search region and the second detection region or the related region overlap with each other, the target setting unit sets the second detection region to the target region.

Further features of the present invention will become apparent from the following description of exemplary embodiments with reference to the attached drawings.

DESCRIPTION OF THE EMBODIMENTS

Hereinafter, preferred embodiments of the present invention will be described in detail with reference to the accompanying drawings. As an example of an apparatus to which an image processing apparatus has been applied, an imaging apparatus configured to detect a pupil, a head, and a body of a person included in an image, set a related region for each detected subject and set a search region and AF target region, and notify a user about the AF target region is shown.

In a process that determines the region that is to be made the AF target region, which corresponds to one among the subject detection frame and the fixed AF frame, it is possible to determine whether or not the subject detection frame and the fixed AF frame are overlapped. If the subject detection frame and the fixed AF frame overlap each other, the subject detection frame is set as the AF target region, and if there is no overlap, the fixed AF frame is set as the AF target region.

When there is the problem that the AF subject is difficult to select, there is a method of enlarging a subject detection frame as a countermeasure to facilitate the selection of a subject as an AF target in a case where the size of the subject is small, or the subject is moving fast. Further, there is a method of widening a determination range of overlapping of the subject detection frame and the fixed AF frame. However, the point that a user must continue to capture the vicinity of a subject is not changed with respect to a subject having a small size or a subject having fast movement. In addition, when the subject detection frame and the overlap determination range are too wide, an adverse effect may occur. Widening the range more than necessary is a factor that prevents a user from setting a region where a subject is not detected as the AF target region. Therefore, in the embodiments below, a method for allowing a user to easily set a subject as an AF target when it is difficult for the user to keep the subject detection frame in the fixed AF frame will be explained.

Figure 1:
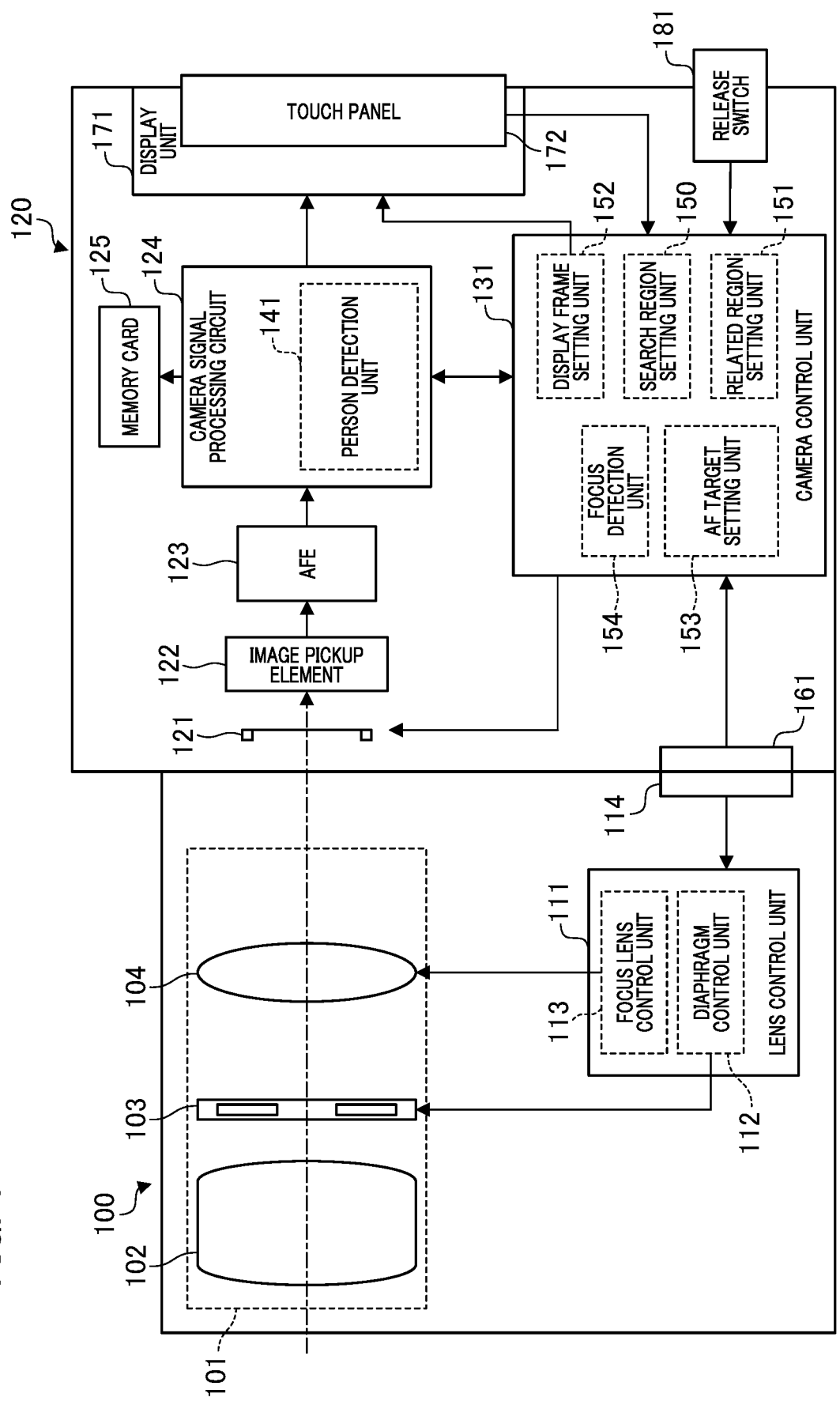
FIG. 1 is a diagram illustrating a configuration example of an imaging apparatus according to the present embodiment.

FIG. 1 is a diagram illustrating a configuration example of an imaging apparatus according to the present embodiment. A configuration of a mirrorless camera with a pupil AF function is exemplified. An interchangeable lens 100 is one among the optical devices which can be mounted on a main body portion 120 of an imaging apparatus. An imaging lens unit 101 of the interchangeable lens 100 includes a main imaging optical system 102, a diaphragm 103 for adjusting a light amount, and a focus lens group 104 for performing focus adjustment.

A microcomputer for controlling a lens system (hereinafter, referred to as a "lens control unit") 111 controls the interchangeable lens 100. A diaphragm control unit 112 controls the operation of the diaphragm 103, and a focus lens control unit 113 controls the operation of the focus lens group 104. For example, the focus lens control unit 113 drives the focus lens group 104 in an optical axis direction of the imaging lens unit 101 based on focus lens driving information acquired from the main body portion 120, and thereby, the focus adjustment control of the imaging optical system is performed. Note that the focus lens group 104 may include a plurality of focus lenses or only a single focus lens. A single focal length lens is shown in FIG. 1 as an example of an interchangeable lens for a purpose of simplifying the drawing, but the interchangeable lens may be a lens having a variable focal length (for example, a zoom lens). In the case of a zoom lens, the lens control unit 111 acquires focal length information from an output of an encoder configured to detect the zoom lens position. In addition, in a case of an interchangeable lens provided with a camera shake correction function, the lens control unit 111 controls a shift lens group for shake correction.

The main body portion 120 includes a shutter 121 used for exposure control and an image pickup element 122 such as a complementary metal oxide semiconductor (CMOS) sensor. An imaging signal output from the image pickup element 122 is processed by an analog signal processing circuit 123 and then transmitted to a camera signal processing circuit 124. A microcomputer for controlling a camera system (hereinafter, referred to as a "camera control unit") 131 controls the imaging apparatus as a whole. For example, the camera control unit 131 controls a shutter driving motor, which is not illustrated, and controls driving of the shutter 121.

A memory card 125 is a storage medium for storing data of a captured image and the like. The camera control unit 131 performs a process of recording data of a captured image on the memory card 125 based on the pressed state of a release switch operated by a user.

An image display unit 171 is provided with a display device such as a liquid crystal panel (LCD). The image display unit 171 performs monitor display of an image of a subject that the user intends to photograph with the camera, and displays the captured image on a screen. A touch panel 172 is an operation unit used when a photographer specifies coordinates on the image display unit 171 with a touch of a finger or a touch pen, or the like, and can be configured integrally with the image display unit 171. For example, the touch panel 172 may be of a built-in type (in-cell type) device incorporated into an inside of a display surface of the image display unit while being configured so as to not obscure a display on the image display unit 171 by its light transmittance. An input coordinate on the touch panel 172 is associated with a display coordinate on the image display unit 171. Thereby, a graphical user interface (GUI) can be configured that enables the user to feel as if the user is directly operating a screen on the image display unit 171 can be displayed. The camera control unit 131 manages the state of an operation performed on the touch panel 172.

The main body portion 120 includes a mount contact portion 161 on a mount surface with the interchangeable lens 100. The mount contact portion 161 is a communication terminal for communicating with the interchangeable lens 100. In contrast, the interchangeable lens 100 includes a mount contact portion 114 provided on a mount surface with the main body portion 120. The mount contact portion 114 is a communication terminal for communicating with the main body portion 120.

The lens control unit 111 and the camera control unit 131 can perform serial communication at a predetermined timing via the mount contact portions 114 and 161. Through this communication, the camera control unit 131 sends the focus lens driving information, diaphragm driving information, and the like to the lens control unit 111, and the lens control unit 111 sends optical information such as a focal length to the camera control unit 131.

The camera signal processing circuit 124 acquires the signal from the analog signal processing circuit 123 and performs signal processing. The camera signal processing circuit 124 is provided with a person detection unit 141. The person detection unit 141 detects a plurality of portions of a person from an image and outputs detection information. Details of the person detection unit 141 are explained in FIG. 2. The person detection result by the person detection unit 141 is sent to the camera control unit 131.

The camera control unit 131 includes a search region setting unit 150, a related region setting unit 151, a display frame setting unit 152, an AF target setting unit 153, and a focus detection unit 154. Each unit is realized by a CPU (central processing unit) provided in the camera control unit 131 executing a program.

The search region setting unit 150 sets a search region based on the coordinates of the fixed AF frame displayed on the image display unit 171 and the touch panel 172 when it is touched. It is possible to set any region in the image as a search region. The related region setting unit 151 sets a related region for each subject included in the detection result acquired from the person detection unit 141.

The display frame setting unit 152 performs a setting for displaying information on the fixed AF frame, the subject detection frame, and the AF target region on the image display unit 171. The AF target setting unit 153 performs the processing of notifying the focus detection unit 154 where the set region is made the AF target region.

The focus detection unit 154 performs focus detection processing based on the image signal corresponding to the target subject to be focused notified by the AF target setting unit 153. The focus detection processing is executed by a phase-difference detection method, a contrast detection method, and the like. In the case of the phase-difference detection method, an image displacement amount is calculated by performing a correlation calculation on a pair of image signals having parallax. A process is carried out in which the image displacement amount is further converted into a defocus amount. A defocus amount can be further converted into a focus lens driving amount by taking account of sensitivity and the like when driving the lens of the interchangeable lens 100. In addition, in the case of the contrast detection method, the in-focus position can be detected based on the contrast evaluation information of the acquired image.

The camera control unit 131 transmits, to the lens control unit 111, drive information such as the focus detection result (image displacement amount or defocus amount) acquired by the focus detection unit 154 or the focus lens drive amount calculated based on a focus detection result. The focus lens control unit 113 controls driving of the focus lens based on the focus lens drive information received from the camera control unit 131. In other words, the camera control unit 131 controls driving of the focus lens via the focus lens control unit 113.

Figure 2:
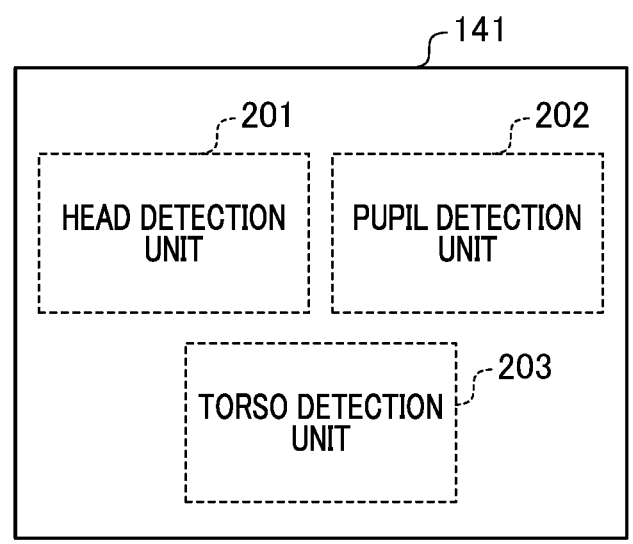
FIG. 2 is a block diagram illustrating a configuration of a person detection unit in the present embodiment.

FIG. 2 is a block diagram illustrating a configuration example of a person detection unit 141. The person detection unit 141 includes a head detection unit 201, a pupil detection unit 202, and a torso detection unit 203.

The head detection unit 201 detects the head region of a person from a captured image. Well-known methods, such as a method based on a result of detecting a characteristic edge or a pattern, or a method using an algorithm in which a face region is learned by machine learning, can be used for head detection.

The pupil detection unit 202 detects a pupil region from the captured image based on the head region output by the head detection unit 201. Well-known methods, such as a method using pattern matching or a method using an algorithm in which a pupil region is learned by machine learning, can be used for pupil detection.

The torso detection unit 203 detects the torso region from a captured image. The torso region includes an upper body portion of the human body from the neck down and from the waist up, and is a rectangular region that does not include arm portions. Similar to the head detection unit 201 and the pupil detection unit 202, well-known methods, such as a method using pattern matching or a method using an algorithm in which a torso region is learned by machine learning, can be used for torso detection.

Figure 3:
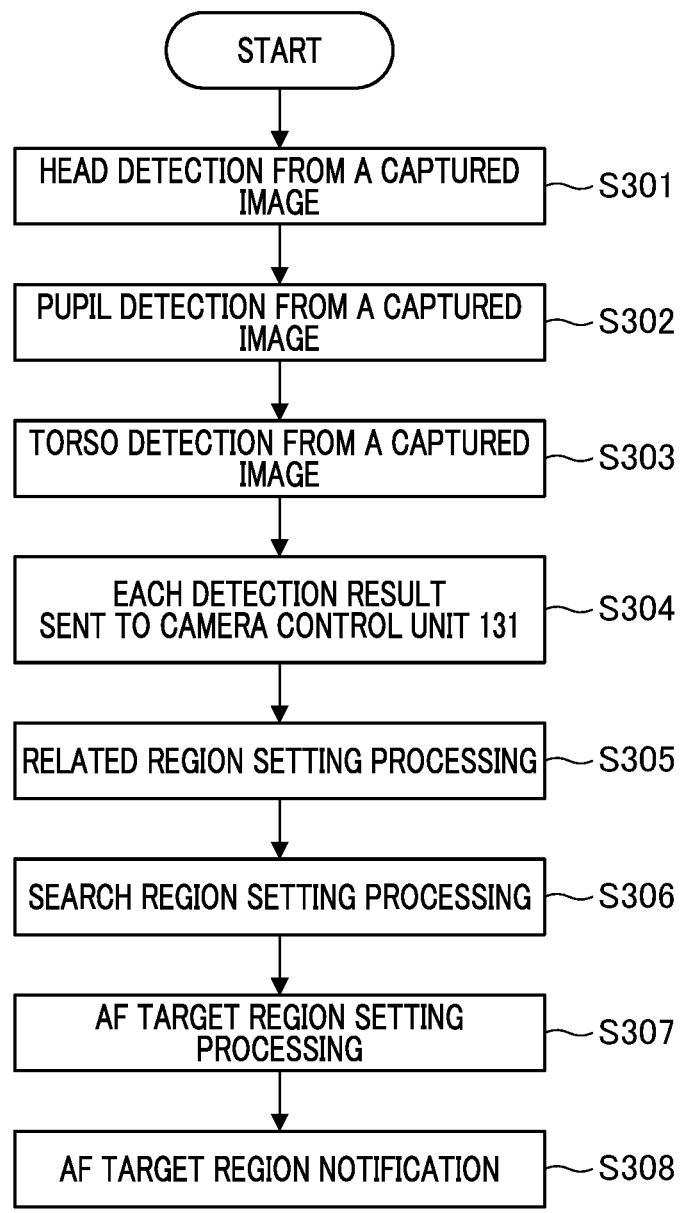
FIG. 3 is a flowchart explaining an operation in the present embodiment.
Figure 4:
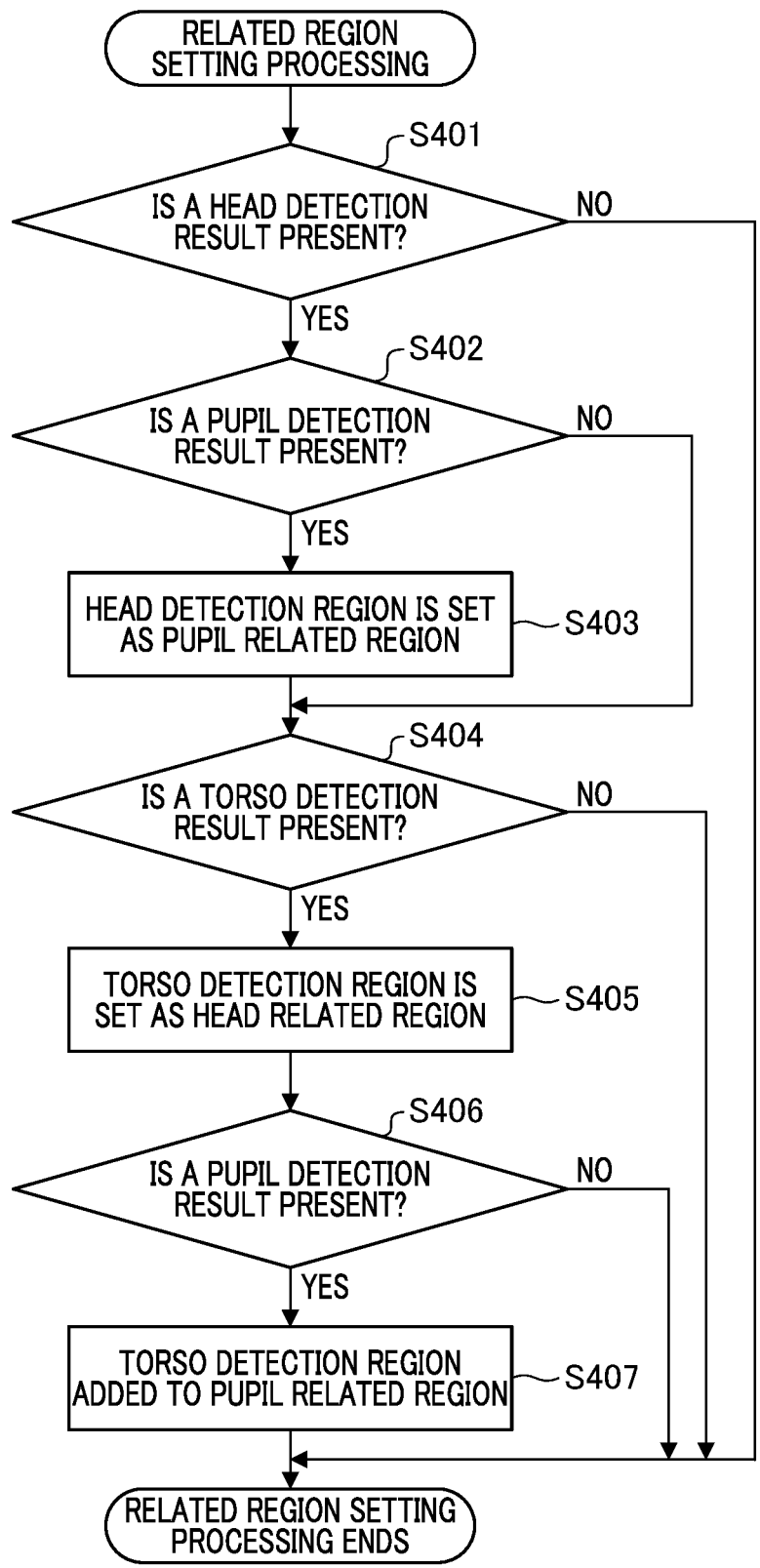
FIG. 4 is a flowchart of a related region setting process.
Figure 5:
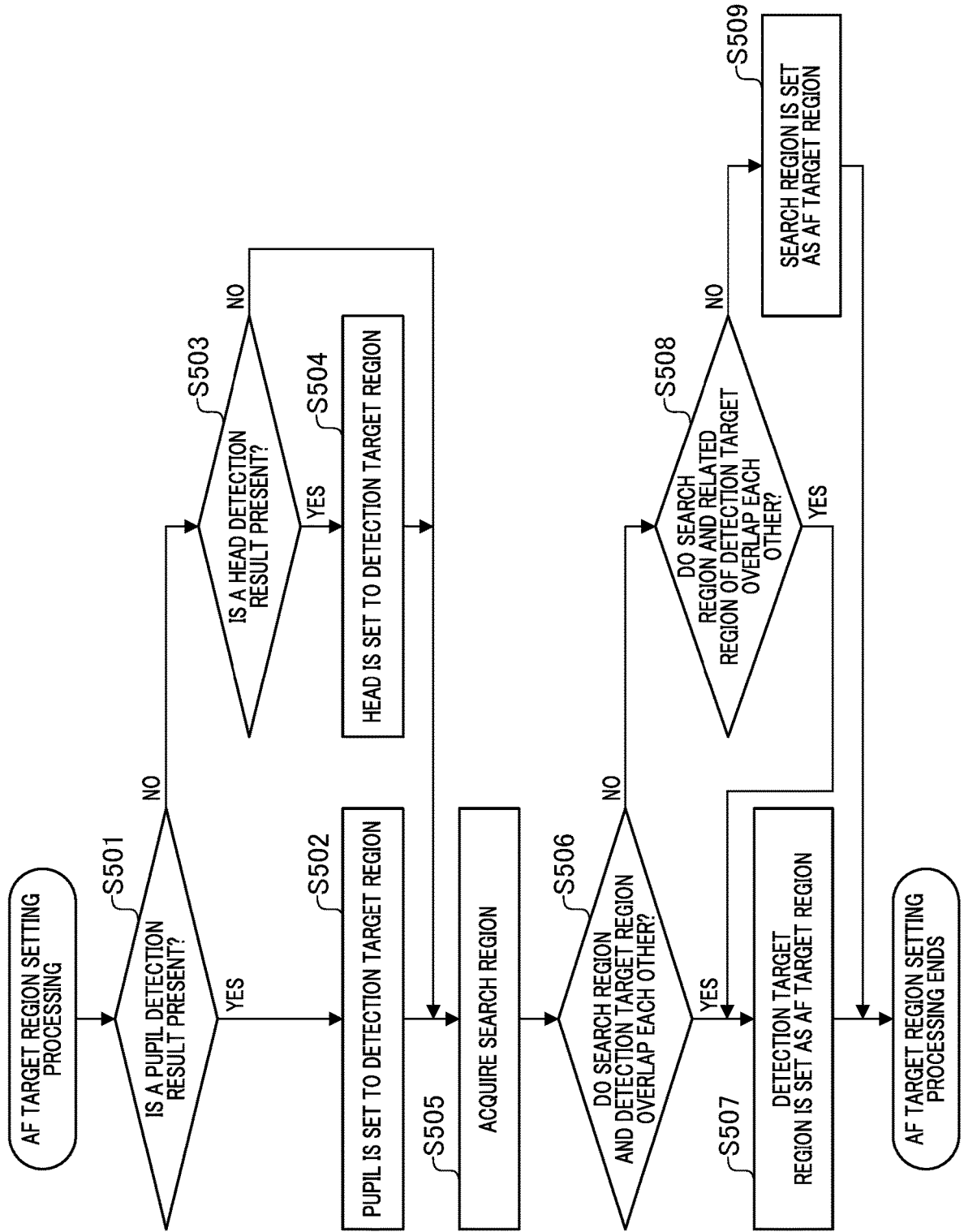
FIG. 5 is a flowchart of an AF target region setting process.

An operation from a subject detection to an AF target notification will be explained with reference to FIG. 3 to FIG. 5. FIG. 3 is a flowchart explaining the overall operation, from the detection of a person by the person detection unit 141 to the notification of an AF target to a user by the camera control unit 131. FIG. 4 is a flowchart explaining a related region setting processing performed by the related region setting unit 151 in FIG. 3. FIG. 5 is a flowchart explaining an AF target region setting processing performed by the AF target setting unit 153 in FIG. 3.

First, in step S301 of FIG. 3, the head detection unit 201 performs head detection from a captured image, and the processing proceeds to step S302. In step S302, the pupil detection unit 202 performs pupil detection using the captured image and the head detection result acquired in step S301. At this time, in a case where there is not even one head detection result acquired in step S301, pupil detection is not performed, and the processing proceeds to step S303.

After step S302, in step S303, the torso detection unit 203 performs torso detection from the captured image, and the processing proceeds to step S304. In step S304, the person detection unit 141 combines each detection result acquired in step S301, step S302, and step S303 into a person detection result. The information of the person detection result is sent to the camera control unit 131. In a case where no detection result is acquired in any of the detections in step S301, step S302, and step S303, the empty person detection result information is sent to the camera control unit 131. After step S304, the processing proceeds to step 305.

In step S305, the related region setting unit 151 sets a related region for each of a detected subject included in the person detection result. Details of the related region setting processing will be described below. In step S306, the search region setting unit 150 sets a search region based on the fixed AF frame displayed on the image display unit 171. The fixed AF frame is determined by the user setting the position and the range of the fixed AF frame. The fixed AF frame is notified to the image display unit 171 by the display frame setting unit 152, and the image display unit displays by superimposing the fixed AF frame on the captured image.

In step S307, the AF target setting unit 153 sets an AF target region. Details of the AF target region setting processing will be described below. Subsequently, in step S308, the display frame setting unit 152 notifies the image display unit 171 about the AF target region information.

The contents of the processing in step S305 (related region setting processing) of FIG. 3 will be explained in detail with reference to FIG. 4. In step S401, the related region setting unit 151 determines whether or not a head detection result is present in the person detection result. In a case where a head detection result is determined to be present, the processing proceeds to step S402. In a case where it is determined that a head detection result is not present, the related region setting processing ends.

In step S402, the related region setting unit 151 determines whether or not a pupil detection result is present in the person detection result. In a case where a pupil detection result is determined to be present, the processing proceeds to step S403. In a case where it is determined that a pupil detection result is not present, the processing proceeds to step S404.

In step S403, the related region setting unit 151 sets the head detection region as the related region of the pupil detection result, and the processing proceeds to step S404. In step S404, the related region setting unit 151 determines whether or not a torso detection result is present in the person detection result. In a case where it is determined that a torso detection result is present, the processing proceeds to step S405. In a case where it is determined that a torso detection result is not present, the related region setting processing ends.

In step S405, the related region setting unit 151 sets the torso detection region as the related region of the head detection result, and the processing proceeds to step S406. In step S406, the related region setting unit 151 determines whether or not a pupil detection result is present in the person detection result. In a case where it is determined that a pupil detection result is present, the processing proceeds to step S407. In a case where it is determined that a torso detection result is not present, the related region setting processing ends. Note that the information showing the result of the determination in step S402 may be retained by the person detection unit 141 and the information may be used in the processing of the subsequent step S406.

In step S407, the related region setting unit 151 adds the torso detection region to the related region of the pupil and ends the related region setting processing.

The contents of the processing in step S307 (AF target region setting process) of FIG. 3 will be explained in detail with reference to FIG. 5. In step S501, the AF target setting unit 153 determines whether or not a pupil detection result is present in the person detection result. In a case where it is determined that a pupil detection result is present, the processing proceeds to step S502. In a case where it is determined that a pupil detection result is not present, the processing proceeds to step S503.

In step S502, the AF target setting unit 153 sets, in the AF target region setting processing, a pupil to the detection target region (also referred to simply as a "detection target region" below), and the processing proceeds to step S505. In step S503, the AF target setting unit 153 determines whether or not a head detection result is present in the person detection result. In a case where it is determined that a head detection result is present, the processing proceeds to step S504. In a case where it is determined that a head detection result is not present, the processing proceeds to step S505.

In step S504, the AF target setting unit 153 sets a head in the detection target region, and the processing proceeds to step S505. In step S505, the AF target setting unit 153 acquires the information of the search region set by the search region setting unit 150 in step S306 of FIG. 3.

In step S506, the AF target setting unit 153 determines whether or not the search region and the detection target region overlap each other. In a case where it is determined that the search region and the detection target region overlap each other, the processing proceeds to step S507. In a case where it is determined that the search region and the detection target region do not overlap each other, the processing proceeds to step S508. However, in a case where the detection target region is not set in the previous processing, it is determined that there is no overlap between the search region and the detection target region, and the processing proceeds to step S508.

In step S507, the AF target setting unit 153 sets the detection target region as the AF target region, and ends the AF target region setting processing. Further, in step S508, the AF target setting unit 153 determines whether or not the search region and the related region of the detection target set as the detection target region overlap with each other. In a case where it is determined that the search region and the related region of the detection target overlap with each other, the processing proceeds to step S507. In a case where it is determined that the search region and the related region of the detection target do not overlap with each other, the processing proceeds to step S509. However, in a case where a detection target region is not set, or a related region is not set to a detection target in the previous processing, it is determined that the search region and the related region of the detection target do not overlap with each other, and the processing proceeds to step S509.

In step S509, the AF target setting unit 153 sets the search region as the AF target region, and ends the AF target region setting processing.

Figure 6B:
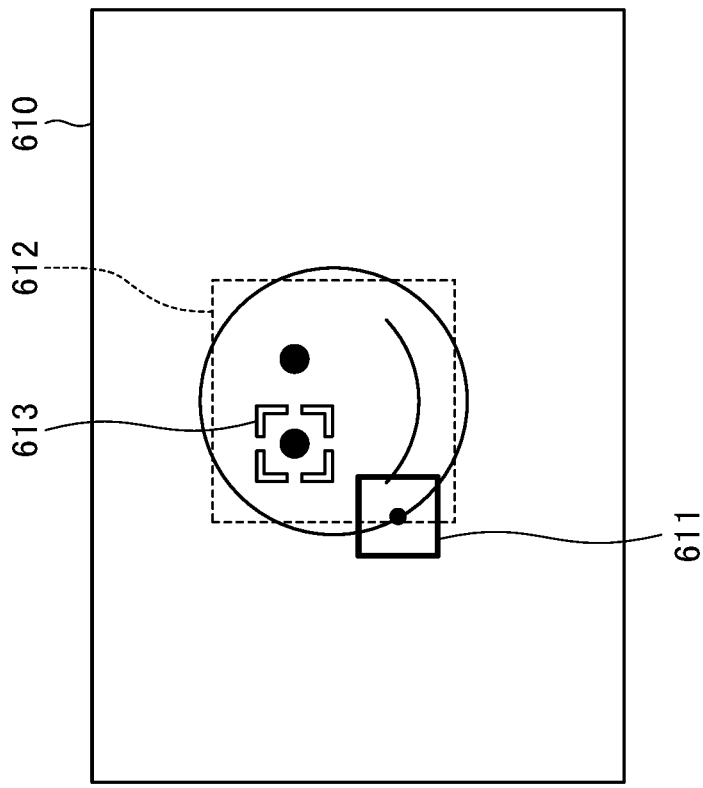
FIGS. 6A and 6B are schematic diagrams illustrating an example of a display screen.
Figure 6A:
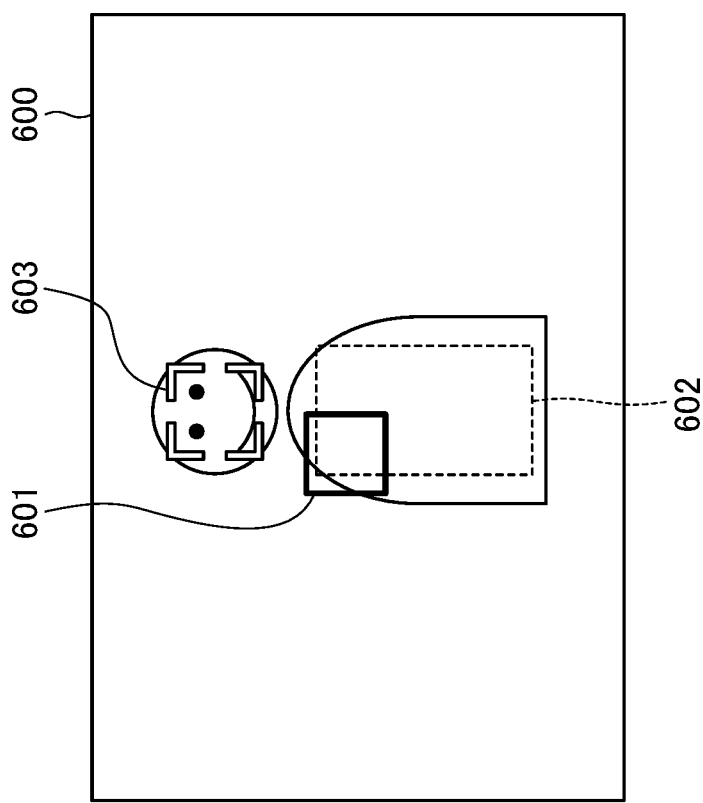

An example of a display is explained with reference to FIGS. 6A and 6B. FIG. 6A is a schematic diagram illustrating an example of a display screen 600 when photographing the upper body of a person that is the subject. FIG. 6B is a schematic diagram illustrating an example of a display screen 610 when photographing the head of a person that is a subject.

In FIG. 6A, a display frame 601 is a frame (AF frame, tracking frame, or the like) that is based on the search region of a subject. A torso detection region 602 of a subject person is a related region related to a head detection region 603 of a subject person. A dotted line illustrates that the torso detection region 602 is a non-display region. The torso detection region 602 is set as a related region that does not include the head detection region 603. In this case, the display frame 601 and the head detection region 603 of the subject person do not overlap with each other on a screen. Accordingly, the processing proceeds from step S506 to step S508 in FIG. 5. Because the display frame 601 and the torso detection region 602 overlap with each other on the screen, the processing proceeds from step S508 to step S507 in FIG. 5. The head detection region 603 is set as an AF target region, and a frame corresponding to the head detection region 603 is displayed on the screen.

In FIG. 6B, a display frame 611 is a frame (AF frame, tracking frame, or the like) based on a search region of the subject. A head detection region 612 of a subject person is a related region related to a pupil detection region 613 of a subject person. A dotted line illustrates that the head detection region 612 is a non-display region. In this case, the display frame 611 and the pupil detection region 613 of the subject person do not overlap with each other on a screen. Accordingly, the processing proceeds from step S506 to step S508 in FIG. 5. Because the display frame 611 and the head detection region 612 overlap with each other on the screen, the processing proceeds from step S508 to step S507 in FIG. 5. A pupil detection region 613 is set as the AF target region, and a frame corresponding to the pupil detection region 613 is displayed on the screen.

In a conventional technique, when a portion of a subject is detected in a display frame, the detection target region cannot be selected as the AF target region unless the display frame and the detection target region overlap with each other. For example, even if a portion of a subject is captured in the AF fixed frame, if the subject detection frame is not captured, the subject cannot be set as an AF target. In contrast, in the present embodiment, a priority order (upper/lower) is set for each portion (including the entire body) of the detected subject. In a case where an operation is performed to set any region as the AF target region, the AF target region is set to the uppermost subject portion that is detected at that time. That is, in a case where a part of the subject is detected within the display frame, if the display frame and the related region of the detection target region overlap with each other, the detection target region can be selected as the AF target region. In other words, it is possible to acquire a detection region of a subject from an image and set its related region, and set the target region for processing by determining the overlap between the search region and the detection region or related region. Therefore, the user can easily specify the desired subject.

In the present embodiment, in a case where a detection target is a pupil or a head, the torso region is set as the related region, and is used in the AF target region setting processing. Because a torso region is a region that does not include the neck and above, the detection region is wider than that of the pupil or head, and the movement of the subject is gentler compared to that of a pupil or a head. Further, because a torso region does not include the pupils or head, which are detection objects even in a state where a detection target is moving intensely, the torso region is hardly affected. Therefore, a user holding the imaging apparatus can easily capture a subject within the region of the AF fixed frame.

In addition, even if the subject has a small detection region size, and is a portion likely to move fast, such as a pupil or a head, if the AF fixed frame is moved closer to the periphery of the torso, the AF fixed frame can be selected as the AF target. Therefore, measures can be taken to address the problem of the difficulty of selecting a subject that the user has targeted as the AF target. Further, because a portion of the same person is set as a related region, there is no interference when the user wants to make another region that is not a person an AF target.

In addition, in the processing based on the algorithm explained in FIGS. 3 to 5, an operation is performed in which the user moves the AF fixed frame closer to the subject until the AF target is selected. In the subsequent operation, processing is carried out in which the AF target is further confirmed by a user operation. When the AF target is confirmed, the subject to be the AF target is fixed (hereinafter, a fixed AF target subject is also referred to as a fixed AF target). A subject other than the fixed AF target is then no longer selected as an AF target. The confirmation of the AF target is released by the user or continues until the imaging apparatus loses sight of the corresponding subject.

The AF target confirmation processing is activated by the user pressing the release switch 181 or by touching the touch panel 172. The subject to be fixed as the AF target differs depending on which method is used to start the processing. For example, in the confirmation processing of the AF target by pressing the release switch 181, the AF target region set in advance is confirmed as the fixed AF target. In contrast, in the confirmation processing of the AF target by the touch operation on the touch panel 172, the fixed AF target is confirmed based on the coordinates specified by the touch operation. In a case where the coordinates specified by the touch operation are included in the detection target region or in the related region of the detection target, the detection target region is confirmed as the fixed AF target region. Further, in a case where the coordinates specified by the touch operation are not included in the detection target region or in the related region of the detection target, a region having the closest saliency around the coordinates specified by the touch operation is confirmed as the fixed AF target region. Saliency is an index showing how close the color, brightness, and depth of each pixel are to each other. Depth is information showing the depth direction of an image, and can be acquired by a known method from information such as the distribution of the amount of image displacement among a plurality of images having different viewpoints, or information on the defocus amount distribution, distance images, or distance map. However, as an exception, when a detection target is a person's pupil or face and the related region is a person's torso region, the coordinates specified by the touch operation may be within the person's torso region. Only in this case, a region of close saliency around the touch position, rather than the detection target region, is confirmed as a fixed AF target region.

According to the above embodiment, a related region related to a detection target region of a subject in a captured image is set, and in a case where the region of the AF fixed frame and the detection target region or its related region overlap with each other, the detection target region can be set as the AF target region.

OTHER EMBODIMENTS

While the present invention has been described in detail with reference to an exemplary embodiment, the present invention is not limited to the specific embodiment described above and various other embodiments are included in the technical scope of the present invention without departing from the spirit and scope of the invention. For example, the subject does not have to be a person, but may be an animal such as a dog or a cat, or an inanimate object, and is not limited to a specific type.

Although an example in which both a head region and a torso region are set as related regions with respect to a pupil region is described in the above embodiment, the detection target and the related region do not have to have a one-to-one correspondence. In addition, as in the case in which there is no related region with respect to the torso, the detected object may be one that does not have a related region.

In addition, in the above embodiment, an example is disclosed with respect to a detection subject in which a detection result of a portion of the same person is used as a related region. However, the present invention is not limited to this example, and the detection subject and the related region may be a different type of subject. For example, the subject may be a person or an ornament or the like. In a case where the subject person is wearing an ornament or the like, the detection region corresponding to the subject person can be set as the AF target region when a search region and a detection region of an ornament or the like, which is a related region, overlap with each other.

As described in the above embodiment, the use of a detection result for the setting of a related region is an example, and the detection result does not have to be used. For example, a region with a fixed range having a certain positional relationship with respect to the detection target region, or a region that is acquired by calculating a range in which the color information and depth information are close may be set as a related region. Alternatively, a region or the like acquired by an algorithm learned so as to calculate a related region of a detected object by machine learning can be set as a related region.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-030780, filed Feb. 26, 2021, which is hereby incorporated by reference wherein in its entirety.

What is claimed is:

1. An image processing apparatus for processing an image, the image processing apparatus comprising:
   at least one processor and memory holding a program which makes the processor function as:
   detection unit configured to detect a first and a second detection region relating to each of a plurality of subjects from the image;
   related region setting unit configured to set the first detection region as a related region relating to the second detection region;
   search region setting unit configured to set a search region based on a position indicated by a user in the image; and target setting unit configured to set an arbitrary region of the image to a target region for processing in the image, wherein the related region setting unit sets a region not including the second detection region as the related region, and wherein, in a case in which the search region and the second detection region or the related region overlap with each other, the target setting unit sets the second detection region to the target region.

2. The image processing apparatus according to claim 1, wherein the target setting unit performs processing configured to provide notification about the target region that has been set.

3. The image processing apparatus according to claim 1, wherein in a case where the search region and the second detection region do not overlap with each other, and the search region and the related region do not overlap with each other, the target setting unit sets the search region to the target region.

4. The image processing apparatus according to claim 1, wherein the first detection region is a region corresponding to a first portion of a subject, and the second detection region is a region corresponding to a second portion of the subject.

5. The image processing apparatus according to claim 1, wherein the detection unit detects a first subject and a second subject, the first detection region is a region corresponding to the first subject, and the second detection region is a region corresponding to the second subject.

6. The image processing apparatus according to claim 1, wherein, in a case where the target setting unit provides notification about the target region that has been set, the target setting unit does not provide notification about the related region.

7. The image processing apparatus according to claim 1, wherein the processor further functions as:

a display unit configured to display a display frame corresponding to the search region, and a display frame corresponding to the target region.

8. An imaging apparatus comprising:

an imaging sensor configured to capture an image of a subject via an imaging optical system; and at least one processor and memory holding a program which makes the processor function as:

detection unit configured to detect a first and a second detection region relating to each of a plurality of subjects from the image;

related region setting unit configured to set the first detection region as a related region relating to the second detection region;

search region setting unit configured to set a search region based on a position indicated by a user in the image;

target setting unit configured to set an arbitrary region of the image to a target region for processing in the image; and display unit configured to display the image, wherein the related region setting unit sets a region not including the second detection region as the related region, and wherein, in a case in which the search region and the second detection region or the related region overlap with each other, the target setting unit sets the second detection region to the target region.

9. The imaging apparatus according to claim 8, wherein the target setting unit performs processing of notifying, by the display unit, that the determined target region serves as a target region of focus adjustment control of the imaging optical system.

10. The imaging apparatus according to claim 9, wherein the target setting unit performs processing for confirming the target region by determining whether or not a position in the image indicated by the user is within the target region or is within the related region.

11. A control method to be executed by an image processing apparatus for processing an image, the method comprising:

detecting a first and second detection regions relating to each of a plurality of subjects from the image;

setting the first detection region as a related region relating to the second detection region;

setting a search region based on a position indicated by a user in the image; and setting an arbitrary region of the image to a target region for processing in the image;

wherein, in the setting of the related region, a region not including the second detection region is set as the related region, and wherein, in a case where the search region and the second detection region or the related region overlap with each other, processing for setting the second detection region to the target region is performed.

12. A non-transitory recording medium storing a control program of an image processing apparatus for processing an image causing a computer to perform each step of a control method of the image processing apparatus, the method comprising:

detecting a first and second detection regions relating to each of a plurality of subjects from the image;

setting the first detection region as a related region relating to the second detection region;

setting a search region based on a position indicated by a user in the image; and setting an arbitrary region of the image to a target region for processing in the image;

wherein, in the setting of the related region, a region not including the second detection region is set as the related region, and wherein, in a case where the search region and the second detection region or the related region overlap with each other, processing for setting the second detection region to the target region is performed.

13. The image processing apparatus according to claim 1, wherein the first detection region is a torso corresponding to a subject, and the second detection region is a face or pupil corresponding to the subject.

14. The image processing apparatus according to claim 1, wherein the target region is determined by the user setting a position and a range.

* * * * *